United States Patent [19]
Yang et al.

[11] Patent Number: 6,096,225
[45] Date of Patent: Aug. 1, 2000

[54] METHOD OF CONTROLLING BIOFOULING IN AQUEOUS MEDIA USING ANTIMICROBIAL EMULSIONS

[75] Inventors: Shunong Yang, Naperville; Michael V. Enzien, Aurora; May M. Wu, Tinley Park; William F. McCoy, Naperville, all of Ill.

[73] Assignee: Nalco Chemical Company, Naperville, Ill.

[21] Appl. No.: 09/151,637

[22] Filed: Sep. 11, 1998

[51] Int. Cl.$^7$ ........................................ C02F 1/50
[52] U.S. Cl. .................... 210/755; 162/161; 210/745; 210/764; 422/28; 514/938; 514/941; 514/942; 514/943
[58] Field of Search ............... 162/161; 210/745, 210/755, 764; 422/28, 37, 36; 514/938, 939, 941, 942, 943

[56] References Cited

U.S. PATENT DOCUMENTS

| | | | |
|---|---|---|---|
| 3,897,562 | 7/1975 | Shema et al. | 424/304 |
| 4,253,877 | 3/1981 | Miale et al. | 106/18.35 |
| 4,518,610 | 5/1985 | Umekawa | 514/516 |
| 4,561,981 | 12/1985 | Characklis | 210/696 |
| 4,954,338 | 9/1990 | Mattox | 424/78 |
| 5,026,723 | 6/1991 | Katayama et al. | 514/441 |
| 5,080,831 | 1/1992 | VanEenam | 252/558 |
| 5,164,096 | 11/1992 | Nunn | 210/754 |
| 5,190,666 | 3/1993 | Bisconte | 210/744 |
| 5,444,078 | 8/1995 | Yu et al. | 210/764 |
| 5,536,305 | 7/1996 | Yu | 106/18.33 |
| 5,547,939 | 8/1996 | Selsted | 210/764 |
| 5,582,869 | 12/1996 | Yu | 427/297 |
| 5,585,341 | 12/1996 | VanEenam | 510/365 |
| 5,632,904 | 5/1997 | Samad et al. | 210/764 |
| 5,656,177 | 8/1997 | Werres | 210/764 |
| 5,702,684 | 12/1997 | McCoy et al. | 422/28 |
| 5,869,423 | 2/1999 | Frisch et al. | 514/941 |

OTHER PUBLICATIONS

Paulus, Wilfried. *Microbicides for the Protection of Materials*. London: Chapman & Hall. 1993. pp. 31–33.

Freid, M.G. et al. *Control of Biocide Applications*. Corrosion 91: The NACE Annual Conference and Corrosion Show. Mar. 11–15, 1991. Cincinnati Convention Center, Cincinnati, Ohio. Paper No. 202.

McIlwaine, Douglas B. Factors to Consider When Freeze–Proofing a Biocide. *Materials Performance*, Sep. 1998. pp. 44–47.

*Primary Examiner*—Peter A. Hruskoci
*Attorney, Agent, or Firm*—Kelly L. Cummings; Thomas M. Breininger

[57] ABSTRACT

A method is disclosed for controlling biofouling in an aqueous medium by treating the aqueous medium with an oil-in-water emulsion comprising an antimicrobial oil phase and at least one emulsifier. This method efficiently controls biofouling in the aqueous medium by specifically targeting the antimicrobial oil phase directly to biofilms, cell surfaces and cell aggregates in a concentrated form.

30 Claims, No Drawings

METHOD OF CONTROLLING BIOFOULING IN AQUEOUS MEDIA USING ANTIMICROBIAL EMULSIONS

FIELD OF THE INVENTION

This invention relates generally to antimicrobial action and, more particularly, to a method of controlling biofouling in aqueous media.

BACKGROUND OF THE INVENTION

Biofouling control is an indispensable and intricate part of industrial water treatment because biofouling can cause heat transfer resistance buildup, system pressure increase, corrosion or scale initiation and propagation. In an industrial water system, biofouling includes the formation of a biofilm, i.e., an adherent population of immobile microorganisms on a surface. Biofilms become a source of cell aggregates to the bulk solution through sloughing events which may be triggered by many environmental changes such as temperature, shear, nutrient and biocide additions. Cell aggregates represent a source of microbial inoculation in a system and potential plugging as dispersed aggregates coalesce. The most abundant population of microorganisms in industrial systems is either associated with biofilms or cell aggregates which are sloughed from biofilms. Thus, the goal of biofouling control involves the removal of the existing biofilm, the disinfection of individual cells and cell aggregates, and the prevention of microorganism regrowth in the treated system. Because of the higher density of bacteria and biopolymer inside biofilm and cell aggregates, a much higher concentration of biocide is needed to achieve a desirable result.

The current practice for dealing with microbial fouling in industrial water systems is by the addition of control agents, namely oxidizing and non-oxidizing biocides, to bulk water flow. For the control agents to reach the biofilm, they have to rely on mass transport, i.e., diffusion or convection. Once the agents reach the biofilm, their concentrations are in a very dilute form, so they do not have enough power or persistency to provide adequate disinfection. Therefore, in practice, the majority of biofouling control agents are either wasted by cooling tower stripping, in blowdown or consumed by reactions in the bulk water.

One approach which has been taken to improve biocide delivery for dealing with biofilm growth on surfaces is the encapsulation of biocides used in antifouling coatings. This approach has been implemented in marine applications, such as in U.S. Pat. No. 4,253,877. However, this type of coating approach is impractical for most water systems because once the initial coating has eroded, it is almost impossible to achieve a subsequent coating.

U.S. Pat. No. 4,561,981 discloses the use of microencapsulation and specific gravity to deliver antifouling chemicals for oil production application. Similar approaches have been proposed for papermaking, such as in U.S. Pat. No. 5,164,096. These encapsulation approaches have also been used by the pharmaceutical and agricultural industries quite extensively for controlled release and targeted delivery. Unfortunately, encapsulation has a major drawback in that it is difficult to prepare and the cost is prohibitive for industrial water treatment applications.

U.S. Pat. No. 4,954,338 teaches another approach which utilizes a microemulsion as a biocide carrier. However, the microemulsion is used primarily to solubilize a very low water-soluble active ingredient and not to target a specific surface. Moreover, the active biocide used in the formulation, namely a low water-soluble chlorinated octyl isothiazolone, is more effective as a fungicide and algacide than a microbiocide, so its application has been limited to algae and fungal control.

Emulsions and microemulsions have been used as a way to formulate surfactant and oil-base solvents as cleaners/degreasers, such as in U.S. Pat. Nos. 5,080,831 and 5,585,341. U.S. Pat. No. 5,656,177 makes use of this property and discloses an oil-in-water emulsion free of toxic microbiocides for biofouling prevention, particularly in papermaking processes. However, although this type of emulsion may be effective to some degree for some time, the non-toxic hydrophobic oil is a nutrient for some microorganisms and will eventually promote a selective type of biofouling.

Accordingly, it would be desirable to provide a method of controlling biofouling in aqueous media more efficiently by specifically targeting the treatment chemicals directly to biofilms, cell surfaces and/or cell aggregates in a concentrated form. By targeting the surfaces of interest, more efficient use of antimicrobial treatment chemicals would be made, thereby providing a more environmentally acceptable and economical use of biocides.

SUMMARY OF THE INVENTION

The method of the invention calls for treating an aqueous medium with an oil-in-water emulsion comprising an antimicrobial oil phase and at least one emulsifier. This treatment method efficiently and effectively controls biofouling in the aqueous medium by specifically targeting biofilms, cell surfaces and/or cell aggregates. The treatment method is also environmentally acceptable and economically appealing because the use of biocides is minimized.

DETAILED DESCRIPTION OF THE INVENTION

The present invention is directed to a method of controlling biofouling in an aqueous medium. In accordance with this invention, the aqueous medium is treated with an oil-in-water emulsion comprising an antimicrobial oil phase and at least one emulsifier.

In one embodiment of this invention, the antimicrobial oil phase is a non-aqueous phase liquid biofouling control agent. The non-aqueous phase liquid biofouling control agents which may be used include, but are not limited to, phenoxytol propanol, pentachlorophenol, 5-chloro-2-(dichlorophenoxy)phenol, 1-(2-hydroxyethyl)-2-alkyl($C_{18}$)-2-imidazoline, $C_8$–$C_{20}$ aliphatic acids, $C_8$–$C_{20}$ aliphatic alcohols and $C_8$–$C_{20}$ aliphatic amines.

In another embodiment of the invention, the antimicrobial oil phase is a non-aqueous phase liquid and a biofouling control agent, wherein the biofouling control agent is soluble in the non-aqueous phase liquid. Suitable non-aqueous phase liquids include, but are not limited to, $C_4$–$C_{30}$ aliphatic alcohols such as octanol, decanol and dodecanol; $C_4$–$C_{30}$ saturated hydrocarbons such as decane, hexane, octadecane and dodecane; $C_4$–$C_{30}$ monounsaturated hydrocarbons such as decene and hexadecene; natural oils such as palm, corn, coconut and soybean oils; and mineral oil paraffins. The biofouling control agents which may be used in accordance with this embodiment of the invention include, but are not limited to, any antimicrobial control agent which can partition into the non-aqueous phase liquid such as glutaraldehyde, 2,2 dibromo-3-nitrilopropionamide, isothiazolone, methylenebisthiocyanate, 2-bromo-2-nitropropane-1,3-diol, 2-(thiocyanomethylthio) benzothiazole, bis(trichloromethyl) sulfone, 5-chloro-2-(2, 4-dichlorophenoxy)phenol, ortho phenylphenol, bromonitroethenylfuran, bromonitrostyrene, tributyltinoxide and 2-methyl-4,5-trimethylene-4-isothiazolin-3-one. The biofouling control agent may also be a chelating agent, such as ethylenediamine tetraacetic acid (EDTA), ethylene glycol-bis($\beta$-aminoethyl ether) tetraacetic acid (EGTA) and 8-hydroxyquinoline.

A reason for using chelating agents and targeting them to biofilm is because chelating agents can extract cationic ions from the biofilm in which cationic ions, such as calcium, are known to cross-link extracellular polymers. Many of the chelating agents are also known to be toxic to microorganisms by causing cell membrane leakage and protein denaturation.

The oil-in-water emulsions which may be used in the practice of this invention include oil-in-water microemulsions, oil-in-water macroemulsions and mixtures thereof.

The emulsifiers that may be used in accordance with the invention include anionic, cationic, nonionic or amphoteric surfactants.

Suitable anionic surfactants include alkyl sulfates having the formula: R—$SO_3$ M, wherein R is any fatty alkyl or alkylaryl group and M is a counterion, such as $Na^+$, $NH^+_4$, $Mg^{++}$ or triethanolamine; ether sulfates having the formula: R—O—$(CH_2CH_2O)_n SO_3M$ wherein R is any fatty alkyl or alkylaryl group and M is a counterion such as, $Na^+$, $NH^+_4$, $Mg^{++}$ or triethanolamine, and n is the number of moles of ethylene oxide; dodecylbenzene sulfonate, alpha olefin sulfonate, diphenyloxide disulfonate, alkyl napthalene sulfonate, sulfosuccinate, sulfosuccinamate, napthanelene-formaldehyde condensate, sulfoester, sulfoamide, alkyl phosphate esters and alkyl ether carboxylate.

The cationic surfactants which may be used include imidazolines, dialkyl quaternary ammonium chlorides, dialkyl benzyl quaternary ammonium chlorides, amine oxides and ethoxylated amines.

Suitable nonionic surfactants include alkanolamides, ethoxylated alkanolamide, ethylene bisamide, fatty acid esters, glycerol esters, sorbitan esters, ethoxylated fatty acids, ethoxylated glycol esters, polyethylene glycol esters, ethoxylated sorbitan esters, alkylphenol ethoxylate, alcohol ethoxylate, tristrylphenol ethoxylate, mercaptan ethoxylate, alcohol alkoxylate, ethylene oxide/propylene oxide (EO/PO) block copolymer, chlorine capped ethoxylate and reverse copolymer.

The amphoteric surfactants which may be used include imidazaline mono acetate, imidazaline diproprionate, imidazaline amphoteric sulfonate, alkyl betaine, sultaine, dihydroxyethyl glycinate, alkyl amidopropropyl betaine and aminopropionate.

It is preferred that the amount of the oil-in-water emulsion which is used to treat the aqueous medium be in the range of about 1 to about 2000 parts per million (ppm). More preferably, the amount of the oil-in-water emulsion used to treat the aqueous medium is in the range of about 5 to about 500 ppm, with about 10 to about 100 ppm being most preferred. Preferably, the oil-in-water emulsion comprises from about 1 to about 70% by weight of the antimicrobial oil phase and from about 1 to about 25% by weight of the emulsifier, the balance of the emulsion being water. The oil-in-water emulsion can be dosed into the aqueous medium either on a continuous basis or slug dosed.

In one embodiment of this invention, where the antimicrobial oil phase is a non-aqueous phase liquid biofouling control agent, the emulsion is prepared by dissolving emulsifiers in either water or the antimicrobial oil phase depending on their solubility. Water-soluble emulsifiers are dissolved in water and water-insoluble emulsifiers are dissolved in the oil phase. The oil phase and aqueous phase solutions are then mechanically mixed with a device such as a homogenizer or blender to form an emulsion.

In another embodiment of the invention, where the antimicrobial oil phase is a non-aqueous phase liquid and a biofouling control agent, the antimicrobial is dissolved in the non-aqueous liquid to form an antimicrobial oil phase solution. Emulsifiers are dissolved in either water or the antimicrobial oil phase depending on their solubility. Water-soluble emulsifiers are dissolved in water and water-insoluble emulsifiers are dissolved in the oil phase. The oil phase and aqueous phase solutions are then mechanically mixed with a device such as a homogenizer or blender to form an emulsion.

For the purpose of controlling the product dosage and tracing the actives, a very small amount (less than 1% by weight of the emulsion) of an oil-base inert dye or a fluorochrome stain, may optionally be formulated into the emulsion. As used herein, the term "inert" means that the dye or stain neither reacts with the other emulsion ingredients nor loses or changes its color or fluorescent properties. The dye or stain should be oil soluble, have very low water solubility, and either have no or different fluorescent emission properties when in the aqueous phase. Examples of the type of dyes and stains which may be used include octadecyl rhodamine B, acylaminofluoresceins, diphenylhexatriene, Nile Red, and Sudan IV (available from Aldrich).

The concentration of the oil-in-water emulsion in the bulk liquid phase can then be detected on-line or off-line after being dosed into the water system by either colorimetric methods or fluorescent methods. The change in tracer concentration in the bulk will indirectly indicate the rate of active consumption or surface adsorption.

When access to surfaces are possible, the concentration of the treatment chemical reaching and adsorbing to the surface could also be directly detected with surface reflectance colorimetry when using colored dyes such as Sudan IV, or fluorometry methods when using fluorescent compounds such as Nile Red. It is understood that when using a fluorometer to detect the fluorescent signal of the oil-base fluorochrome stain, the excitation and emission filters of the fluorometer must be set to detect the appropriate signal from the selected fluorochrome stain.

The method of the present invention may be used to control biofouling in an aqueous medium such as an industrial water system. Typical industrial water systems include those in pulp and paper processing mills, open recirculating cooling water systems, cooling ponds, reservoirs, sweetwater applications, decorative fountains, pasteurizers, evaporative condensers, hydrostatic sterilizers and retorts, gas scrubber systems and air washer systems. The inventive method may also be used in other aqueous media, such as in oil and gas production processes, food and beverage processes, recreational water and the like.

Treating an aqueous medium with an oil-in-water emulsion comprising an antimicrobial oil phase and at least one emulsifier efficiently and effectively controls biofouling by specifically targeting biofilms, cell surfaces and/or cell aggregates. With regard to the biofilms and cell aggregates, it should be noted that control with conventional biocide applications is relatively ineffective because the dilution of the active ingredient is very high, so the microorganisms are protected from the effects of the antimicrobial agent. The oil-in-water emulsions disclosed herein provide a means to overcome the protection microorganisms derive from being in suspended cell aggregates and in biofilms by delivering microscopic particles containing highly concentrated (percent level) active ingredient directly onto the surface of the cell aggregate or biofilm. The oil-in-water emulsions of the present invention also exhibit several important attributes, namely that they protect the active ingredient from contaminants which might be present in the aqueous medium, they rapidly kill the microorganisms independent of pH changes, they have an affinity for biofilms and cell surfaces, and they exhibit controlled release of the antimicrobial agents to the cell surfaces.

EXAMPLES

The following examples are intended to be illustrative of the present invention and to teach one of ordinary skill how to make and use the invention. These examples are not intended to limit the invention or its protection in any way.

Example 1

Phenoxytol Propanol Microemulsion

Phenoxytol propanol (PPh) microemulsion is commonly used as an organic solvent. However, PPh also has biocidal activity. (See "Microbicides for the Protection of Materials," Wilfried Paulus, $1^{st}$ ed., 1993, Chapman & Hall.) The oil-in-water microemulsion of PPh can be formed spontaneously by mixing appropriate amounts of water, PPh, sodium dodecylbenzenesulfonate (SDBS), and sodium xylenesulfonate. Formulations of the PPh microemulsion are listed below in Table 1. The values in the table represent weight fractions.

TABLE 1

| Formulation # | phenoxytol propanol | SDBS | xylene sulfonate (40%) | water |
|---|---|---|---|---|
| 1 | 0.3 | 0.1 | 0.1 | 0.5 |
| 2 | 0.1 | 0.1 | 0.05 | 0.75 |
| 3 | 0.1 | 0.03 | 0.1 | 0.77 |
| 4 | 0.1 | 0.03 | 0.075 | 0.795 |
| 5 | 0.1 | 0.065 | 0.05 | 0.785 |
| 6 | 0.1 | 0.065 | 0.1 | 0.735 |
| 7 | 0.2 | 0.1 | 0.05 | 0.65 |
| 8 | 0.1 | 0.065 | 0.075 | 0.76 |
| 9 | 0.2 | 0.1 | 0.075 | 0.625 |

The effect of formulation #1 on biofilm removal was tested in a laboratory tubular biofilm reactor. Cooling water mixed culture biofilm was grown under 3 ft/sec flow velocity on a polyvinyl chloride (PVC) tubing surface. The thickness of the biofilm tested was approximately 100 $\mu$m. The change in biofilm thickness was monitored continuously with a differential pressure transducer through a set of ⅛" ID tubing, 16 ft. in length. Repeatedly, significant biofilm removal (>70%) was observed with an 8-hour continuous PPh microemulsion treatment. The biofilm treatment results are summarized below in Table 2. The treatment dosage used was 600 ppm as PPh. For product tracing purposes, a small quantity of oil-soluble dye (0.1 g Sudan IV per 40 mL of microemulsion) was added to stain the microemulsion red. During a coupon study in which a biofilm coupon was immersed in 600 ppm of PPh microemulsion solution, the red color was transferred from the liquid phase to the biofilm coupon surface after a few hours. This indicates that PPh absorbed into the biofilm.

TABLE 2

|  | Experiment 1 | | | Experiment 2 | |
|---|---|---|---|---|---|
|  | Pressure drop for Tubular I | Pressure drop for Tubular II | CFU*/ $cm^2$ | Pressure drop for Tubular I | Pressure drop for Tubular II |
| Before treatment | 2.24 | 3.19 | 4.7e9 | 1.07 | 1.16 |
| After Treatment | 0.46 | 0.55 | 5.3e7 | 0.31 | .35 |
| Biofilm removal (%) | 79.5 | 82.8 | 98.9 | 71 | 70 |

*colony forming unit

A control experiment was also conducted by treating the biofilm with the same dosage of surfactant without PPh. The percentage of biofilm removal achieved was only 44±1%.

Example 2

Glutaraldehyde and DBNPA/Decanol Emulsion

Preparation of glutaraldehyde/decanol emulsions first required a liquid/liquid extraction. 30 ml of 50% glutaraldehyde by weight in water (Piror 850, available from Union Carbide) were mixed with 30 ml of 1-decanol. The mixture was agitated for 24 hours. The decanol was separated from the aqueous phase by gravity. The glutaraldehyde partition coefficient for decanol/water is 1.26 (molar ratio). The glutaraldehyde/decanol solution was then used as the non-aqueous phase antimicrobial oil to generate emulsions.

The dried concentrated 2,2 dibromo-3-nitrilopropionamide (DBNPA) (98%) was directly solubilized into decanol (1.5–6.1 wt. %). The DBNPA decanol solution was then emulsified.

The surfactants of the formulations in Table 3 were dissolved into water or decanol phase depending on their solubility. The two solutions were then mixed together using either homogenization or vortexing. Many of these emulsions showed excellent stability for as long as 9 months at room temperature.

TABLE 3

| Chemical Components | Emulsion Formulations (wt %) | | | | | | | | | | | | |
|---|---|---|---|---|---|---|---|---|---|---|---|---|---|
|  | A | B | C | D | E | F | G | H | I | J | K | L | M |
| Non Aqueous Phase Liquid: | | | | | | | | | | | | | |
| Glutaraldehyde/Decanol | 22.7 | 20.6 | 20.6 | 20.6 | 20.8 | 20.6 | 20.6 | 20.8 | 20.8 | 26.3 | — | 21.6 | — |
| DBNPA/Decanol | — | — | — | — | — | — | — | — | — | — | 20.6 | — | 34.8 |

TABLE 3-continued

| Chemical Components | Emulsion Formulations (wt %) | | | | | | | | | | | | |
|---|---|---|---|---|---|---|---|---|---|---|---|---|---|
| | A | B | C | D | E | F | G | H | I | J | K | L | M |
| Non Aqueous Phase Surfactants: | | | | | | | | | | | | | |
| Mirataine ® ASC | 5.2 | 16.7 | 5.2 | 5.2 | — | — | 5.2 | — | — | — | — | | |
| Dowfax ™ 2A-1 | 5.2 | 10.8 | 4.1 | — | — | — | — | — | — | — | — | | |
| TWEEN ® 81 | — | — | — | — | — | — | 1.0 | 1.0 | — | — | — | | |
| SPAN ™ 40 | — | — | — | — | — | — | — | — | 4.3 | — | — | | |
| Alkamuls ® o-14 | — | — | — | — | — | — | — | — | — | 5.3 | — | 5.2 | |
| Alkamuls ® EL-985 | — | — | — | — | — | — | — | — | — | 5.3 | — | 5.2 | |
| Alkamuls ® EL-620 | — | — | — | — | — | — | — | — | — | — | — | — | 4.6 |
| Arlatone ™ G | — | — | — | — | — | — | — | — | — | — | — | — | 4.6 |
| Pluronic ® P103 | 5.2 | 2.9 | 4.1 | — | — | — | — | — | — | — | — | | |
| Pluronic ® L63 | — | — | — | 5.2 | 5.2 | 10.3 | — | — | — | — | 8.2 | | |
| Pluronic ® P65 | — | — | — | 5.2 | 5.2 | 10.3 | 9.3 | 9.4 | 10.4 | — | 12.4 | | |
| Water | 61.9 | 49.0 | 66.0 | 63.9 | 68.8 | 58.8 | 63.9 | 68.8 | 64.5 | 63.2 | 58.8 | 68.0 | 56.0 |
| Total | 100 | 100 | 100 | 100 | 100 | 100 | 100 | 100 | 100 | 100 | 100 | 100 | 100 |
| IPV* % | 26.7 | 22.2 | 24.1 | 24.1 | 24.2 | 24.2 | 24.1 | 24.2 | 24.2 | 30 | 24.2 | 25 | 30 |

*IPV = internal phase volume

Example 3

This experiment was conducted to evaluate emulsion stability at 54° C. and upon dilution. Emulsion stability was evaluated by appearance. An unstable emulsion is seen when there is creaming or phase separation. Emulsions J and L, prepared above in Example 2, were tested at 54° C. in concentrate form. Emulsion J was tested at 25° C. at two dilutions (1:10 and 1:20). None of the emulsions showed any creaming or phase separations for 30 days.

Example 4

The release of glutaraldehyde from decanol emulsions prepared in Example 2 was evaluated using dialysis technique at room temperature. 2 ml of concentrated emulsion containing glutaraldehyde were added into a dialysis cassette (Cellulose membrane with 10,000 molecular weight cut-off, Slide-A-Lyzer, Pierce). The cassette was agitated in a beaker containing 450 ml of cooling water (pH 8.3). Glutaraldehyde was released to the dialysate (cooling water) from the emulsion during dialysis. Aliquots of sample were taken from the dialysate. The concentration of the glutaraldehyde remaining inside the dialysis chamber was also determined at the end of the experiment. Analyses of glutaraldehyde in both the dialysate and the concentrated emulsion products were performed using both gas chromatography and calorimetric methods. Colorimetric analyses were performed on the glutaraldehyde 3-methyl-2-benzothiazolinone hydrazone (MBTH) complex, which was formed after heating in boiling water for 5 minutes (See Freid, et. al., 1991, CORROSION/91, paper #202, NACE Annual Conference, March 11–15, Cincinnati, Ohio). The percentages of glutaraldehyde released are listed below in Table 4. As illustrated in the table, emulsions I, J and L demonstrated slow release of the microbiocide into the cooling water.

TABLE 4

| | Emulsion I | Emulsion J | Emulsion L | Control* |
|---|---|---|---|---|
| glutaraldehyde (% wt) | 5 | 7.2 | 5.9 | 4.8 |
| t = 0 | 0 | 0 | 0 | 0 |
| 1 hr. | 52.15 | 58.5 | 60.6 | 97.8 |

TABLE 4-continued

| | Emulsion I | Emulsion J | Emulsion L | Control* |
|---|---|---|---|---|
| 2 hr. | 67.22 | 66.3 | 66.9 | 99.3 |
| 4 hr. | 84.03 | 74.6 | 73.6 | 100 |

*glutaraldehyde solution prepared from concentrate (Piror 850)

Example 5

Minimum Inhibitory Concentrations (MIC) tests were run for many of the emulsions formulated above in Example 2 and compared with glutaraldehyde alone. Both Gram negative and Gram positive microorganisms were tested. MIC tests were conducted in a minimal media of the following composition (g/L): 0.05 $CaCl_2$; 0.2 $MgSO_4\text{-}7H_2O$; 0.33 $K_2HPO_4$; 0.07 yeast extract and 2 glucose. Starting cell densities were $10^6$ and $10^5$ cells/mL for *Pseudomonas fluorescens* and *Paenibacillus macerans*, respectively. MIC tests were conducted in 96 multiwell plates and scored after all control wells had turned positive for growth. This usually took 12–24 hours. The results shown below in Table 5 indicate that the emulsions had equivalent or slightly better MIC values than glutaraldehyde.

TABLE 5

| Biocide/Emulsion-biocide* | Paenibacillus macerans | Pseudomonas fluorescens |
|---|---|---|
| D | 1.4–2.9 | 5.7–11.4 |
| E | 1.8–3.6 | 3.6–7.2 |
| Glutaraldehyde | 1.6–3.1 | 6.0–12.0 |
| control (no biocide) | all positive | all positive |

All concentrations ppm (w/w) as glutaraldehyde.
*Paenibacillus macerans* - gram positive spore forming bacterium
*Pseudomonas fluorescens* - gram negative bacterium The MIC results demonstrate that the glutaraldehyde containing emulsions retained activity as antimicrobial agents. This is an important feature because some forms of microencapsulation are so well encapsulated that the active ingredient becomes less active. This is also a surprising result because it is known in the literature that glutaraldehyde and primary alcohols such as decanol react to form acetals (See "Factors to Consider When Freeze-Proofing a Biocide," Douglas B. McIlwaine, 1998, Materials Performance, 37(9):44–47.) Acetals have very little, if any, biocidal efficacy.

Example 6

Fluorescence microscopy was used to show the adsorption and absorption of emulsion particles to corroded metal surfaces, biofilms and bacteria cells. Emulsions were stained with the lipophilic fluorochrome, Nile Red (1 μg/mL), so that the attachment of the emulsions to the surface of interest could be visually documented. The surfaces of interest (biofilms, cell surfaces and/or cell aggregates) were exposed to 1.0% solutions of stained emulsions (10 ng/mL Nile Red) for short contact times of less then 1 minute and then vigorously rinsed prior to microscopic observation. Bacteria cells were exposed to emulsions for longer contact times of 24 hours. The attachment of emulsion particles was observed for all of these surfaces under a fluorescent microscope.

Example 7

This example was designed to determine the speed of kill for glutaraldehyde and decanol emulsions compared to free glutraldehyde, as well as the effects of pH on speed of kill. Glutaraldehyde and glutaraldehyde emulsion J (prepared above in Example 2) were both dosed at 50 ppm concentrations as glutaraldehyde. The decanol emulsion was prepared as described in Example 2 with the following composition in weight %: 26 decanol, 5.3 Alkamuls O-14, 5.3 Alkamuls EL-985 and 63.4 water. The decanol emulsion was diluted the same order of magnitude as the glutaraldehyde emulsion (1,680×, 150 ppm as decanol). Phosphate buffered saline (PBS) washed cells of *Pseudomonas aeruginosa* culture were used as the target microorganisms. The time points for this study were 2, 10, 30 and 60 minutes.

The effect of pH on the speed of kill was conducted in a similar manner. Only one contact time (10 minutes) was used for this study and the emulsions and glutaraldehyde were placed in 3 different pHs, i.e., 5, 7, and 10, just prior to the addition of cells. The buffer consisted of acetic acid (0.04 M), phosphoric acid (0.04 M) and boric acid (0.04 M). The correct pH was obtained by the addition of NaOH.

In both experiments, after each time point, samples were taken and placed into dilution tubes containing 300 ppm sulfite to deactivate any residual biocide. Microbial enumerations were conducted with standard plate counts on tryptone, glucose, yeast extract agar (TGE) solid media. Tables 6 and 7 show the results from these experiments. The emulsion compositions achieved a greater than 3 $Log_{10}$ reduction in the concentration of viable bacteria after 8 minutes while the glutaraldehyde took 30 minutes to achieve a similar kill (Table 6). After 10 minutes, only the emulsions were able to achieve a kill at a pH of 5 and 7 with a greater than 4 $Log_{10}$ reduction in the concentration of viable bacteria at a pH of 5 (Table 7). In contrast, glutaraldehyde only had a fast speed of kill at a pH of 10.

TABLE 6

|  | CFU*/mL | | | $Log_{10}$ (CFU/mL) Reduction | | |
| --- | --- | --- | --- | --- | --- | --- |
| Time (min.) | Glutaraldehyde | Glutaraldehyde Emulsion J | Decanol Emulsion | Glutaraldehyde | Glutaraldehyde Emulsion J | Decanol Emulsion |
| 2 | 6.2E + 06 | 2.0E + 04 | 8.0E + 03 | 0.0 | 2.5 | 2.9 |
| 8 | 3.5E + 06 | 1.0E + 02 | 1.0E + 03 | 0.2 | 4.8 | 3.8 |
| 15 | 5.0E + 04 | 1.0E + 01 | 1.0E + 02 | 2.1 | 5.8 | 4.8 |
| 30 | 5.0E + 02 | 1.0E + 01 | 1.0E + 02 | 4.1 | 5.8 | 4.8 |
| 60 | 1.0E + 02 | 1.0E + 01 | 1.0E + 02 | 4.8 | 5.8 | 4.8 |
| Control | 6.20E + 06 | | | | | |

*CFU = colony forming unit, measures the viable (living) bacterial cells in the sample.

TABLE 7

|  | CFU/mL | | | $Log_{10}$ (CFU/mL) Reduction | | |
| --- | --- | --- | --- | --- | --- | --- |
| pH | 5 | 7 | 10 | 5 | 7 | 10 |
| Control | 5E + 06 | 9E + 06 | 1E + 07 | | | |
| Glutaraldehyde | 7E + 06 | 1E + 07 | 1E + 02 | 0.0 | 0.0 | 5.1 |
| Glutaraldehyde Emulsion J | 1E + 02 | 1E + 05 | 1E + 02 | 4.7 | 1.8 | 5.1 |
| Decanol Emulsion | 1E + 02 | 3E + 03 | 1E + 01 | 4.7 | 3.6 | 6.1 |

Example 8

One commonly observed problem in water treatment is that when glutaraldehyde is used simultaneously with oxidizing bromine biocides, there is an observed resultant loss of bromine residual. Thus, an experiment was designed to test the effect of emulsified glutaraldehyde on the loss of oxidizing bromine residual. Six different treatments of oxidizing bromine biocides plus 200 ppm as glutaraldehyde or no glutaraldehyde were added to beakers containing 500 mL of artificial cooling water. Each baker was continuously agitated with a stirbar and sampled every 15 minutes for 1 hour and every 30 minutes thereafter until 2 hours. The starting concentrations for total halogen residuals for all six beakers ranged from 5.5–6.5 ppm as $Cl_2$. N,N-diethyl-p-phenylenediamine (DPD) calorimetric method (Standard Methods for the Examination of Water and Wastewater, 19th ed., Method 4500-Cl G) was used to monitor the change of bromine residual. Glutaraldehyde was dosed in two different forms, namely free glutaraldehyde and as the glutaraldehyde emulsion. Half-life values were calculated from the halogen residuals versus time data. Table 8 illustrates that the glutaraldehyde emulsion of this invention is less reactive and more compatible with oxidizing bromine biocides, especially Nalco Chemical Company's STABREX™ product, than free glutaraldehyde. This attribute allows for better combined usage of bromine products with glutaraldehyde.

In this example, the chemical half-life of bromine was more than doubled by using STABREX™, stabilized liquid bromine, and the glutaraldehyde emulsion F prepared in Example 2. This improved compatibility results in superior performance because the halogen-based biocide and the glutaraldehyde are not as quickly consumed by chemically reacting with each other.

TABLE 8

|  | Half-life of Oxidizing Bromine (min.) |
|---|---|
| Bromine + Glutaraldehyde | 33 |
| Bromine + Glutaraldehyde Emulsion F | 40 |
| STABREX ™* + Glutaraldehyde | 40 |
| STABREX + Glutaraldehyde Emulsion F | 71 |
| Sodium hypobromite | 319 |
| STABREX | 666 |

*STABREX - Nalco Chemical Company (U.S. Patent No. 5,683,654)

Example 9

Sulfite is frequently found as a contaminant in water treatment programs, either from carry over in the Kraft bleaching process of pulp or as process contaminants in cooling water systems. Sulfite very quickly deactivates glutaraldehyde and DBNPA as a biocide in less than 10 minutes and frequently the sulfite demand is overcome by adding additional biocide. This is an expensive way of overcoming biocide demand in a contaminated system.

Experiments were conducted to look at the degree and length of time glutaraldehyde and DBNPA could be stabilized or protected from deactivation by sulfite. Separate trials were conducted with and without the addition of sulfite to artificial cooling water. Sulfite was added at a 3:1 molar ratio to glutaradehdye (3 mM sulfite: 1 mM [100 ppm] glutaraldehyde). Glutaraldehyde and glutaraldehyde emulsions were exposed to sulfite containing cooling water for 2 and 4 hours prior to the addition of 0.25 mL of phosphate buffered washed cells, Pseudomonas aeruginosa.

For the DBNPA emulsion deactivation experiments, 10 ppm as DBNPA was exposed to 50 ppm of sulfite for l hour prior to the addition of cells. The cells were then incubated for an additional 2 hours prior to microbial enumerations. The total volume of the treatment fluid was 25 mL contained in disposable polystyrene test tubes. Standard plates counts were used to enumerate colony forming units (CFU)/mL.

Testing with the glutaraldehyde and DBNPA emulsions demonstrated that these biocides remained active in the presence of the sulfite which deactivates the free biocides, as shown in Table 9. Because both of these biocides were very quickly deactivated by sulfite, the data suggest that the emulsion particles deliver the active ingredient directly to cell surfaces rather than partitioning back into the bulk phase which would deactivate the biocides before reaction with the cells.

TABLE 9

| Treatment | CFU/mL | $Log_{10}$ (CFU/mL) reduction |
|---|---|---|
| Control, no treatment | 1.6E+7 |  |
| Glutaraldehyde | 1.0E+1 | 6.2 |
| Glutaraldehyde + $SO_3^{2-}$ (10 min.)* | 3.3E+7 | 0.0 |
| Glutaraldehyde Emulsion F | <1.0E+1 | 6.2 |
| Glutaraldehyde Emulsion F + $SO_3^{2-}$ (2 hr.) | 1.0E+4 | 3.2 |
| Glutaraldehyde Emulsion F + $SO_3^{2-}$ (4 hr.) | 1.1E+4 | 3.2 |
| DBNPA | <1.0E+1 | 6.5 |

TABLE 9-continued

| Treatment | CFU/mL | $Log_{10}$ (CFU/mL) reduction |
|---|---|---|
| DBNPA + $SO_3^{2-}$ (10 min.) | 1.3E+7 | 0.7 |
| DBNPA Emulsion K | 1.0E+1 | 6.5 |
| DBNPA Emulsion K + $SO_3^{2-}$ (1 hr.) | 1.3E+4 | 3.7 |

*The times represent the deactivation time prior to microbial cell additions.

Example 10

Papermaking slurries frequently have sulfite carried over from the bleaching processes or have sulfite purposely added as deactivating agents of oxidizing biocides prior to dye additions. Broke chests are a frequent trouble spot for microbial control in papermaking systems and nonoxidizing biocides are frequently added to gain control in these systems. Broke slurries can have high concentrations of facultative anaerobes as a result of poor microbial control. These anaerobes produce odorous fatty acid fermentation products, i.e., volatile fatty acids, which can impart undesirable odors and produce dangerous concentrations of organic gases.

DBNPA emulsion K, prepared in Example 2, was tested versus DBNPA for microbial control of facultative anaerobes and acid producing bacteria (APBs) in papermaking broke slurries with and without sulfite contamination. Coated broke slurries from a papermill were used for this study. Previous studies with this broke slurry revealed no residual toxicity as measured with Nalco's TRA-CIDE® technology and microbial viable counts of facultative anaerobes were on the order of $10^7$ CFU/mL. There was no residual sulfite in the broke sample, so 52 µL of a 2.4% sulfite solution were added to 25 mL of broke slurry to achieve 50 ppm sulfite final concentration in the slurries. Slurries were well mixed prior to the addition of DBNPA or DBNPA emulsion K. Control tests received either DBNPA or DBNPA emulsion treatment, but no sulfite addition, and another control received no treatment at all. Sampling time points for all treatments were 0.5, 1 and 2 hours. The concentration of DBNPA as active was 10 ppm. The enumeration of facultative anaerobes was conducted on thioglycolate agar pour plates and acid producer bacteria on APB media using most probable number (MPN) enumerations. The composition of APB media (g/L) was: 5.0 tryptone, 2.5 glucose, 0.5 NaCl, 1.0 $K_2HPO_4$ and 0.015 Chlorophenol Red, pH adjusted to 7.0 with NaOH. APB media is scored positive for growth when the pH indicator changes color from purple to yellow. As shown in Table 10, the results indicate improved performance using the DBNPA emulsion when sulfite is present in broke slurries.

TABLE 10

|  | APBs MPN/mL | Anaerobes CFU/mL | APBs $Log_{10}$ | Anaerobes Reductions |
|---|---|---|---|---|
| Control $DBNPA+SO_3^{-2}$ | 2.1E+07 | 5.0E+7 |  |  |
| 0.5 hr. | 1.2E+07 | 2.4E+7 | 0.2 | 0.3 |
| 1 hr. | 7.9E+07 |  | 0.0 |  |
| 2 hr. | 8.0E+06 | 5.0E+7 | 0.4 | 0.0 |

TABLE 10-continued

| | APBs MPN/mL | Anaerobes CFU/mL | APBs $Log_{10}$ | Anaerobes Reductions |
|---|---|---|---|---|
| DBNPA emulsion K +SO$_3$−2 | | | | |
| 0.5 hr. | 1.2E+05 | 1.8E+5 | 2.2 | 2.4 |
| 1 hr. | 3.7E+05 | 5.6E+4 | 1.7 | 3.0 |
| 2 hr. | 7.7E+04 | 1.6E+5 | 2.4 | 2.5 |

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of controlling biofouling in an aqueous medium comprising the step of treating the aqueous medium with an effective biofouling controlling amount of an oil-in-water emulsion comprising an antimicrobial oil phase and at least one emulsifier, wherein the antimicrobial oil phase is a non-aqueous phase liquid biofouling control agent selected from the group consisting of phenoxytol propanol, pentachlorophenol, 5-chloro-2-(dichlorophenoxy)phenol and 1-(2-hydroxyethyl)-2-alkyl($C_{18}$)-2-imidazoline.

2. The method of claim 1 wherein the oil-in-water emulsion is selected from the group consisting of microemulsions, macroemulsions and mixtures thereof.

3. The method of claim 1 wherein the emulsifier is selected from the group consisting of anionic, cationic, nonionic and amphoteric surfactants.

4. The method of claim 3 wherein the anionic surfactant is selected from the group consisting of alkyl sulfates having the formula: R—$SO_3$M, wherein R is a fatty alkyl or alkylaryl group and M is a counterion selected from the group consisting of $Na^+$, $NH^+_4$, $Mg^{++}$ and triethanolamine; ether sulfates having the formula: R—O—$(CH_2CH_2O)_n SO_3M$ wherein R is a fatty alkyl or alkylaryl group and M is a counterion selected from the group consisting of $Na^+$, $NH^+_4$, $Mg^{++}$ and triethanolamine, and n is the number of moles of ethylene oxide; dodecylbenzene sulfonate, alpha olefin sulfonate, diphenyloxide disulfonate, alkyl napthalene sulfonate, sulfosuccinate, sulfosuccinamate, napthanelene-formaldehyde condensate, sulfoester, sulfoamide, alkyl phosphate esters and alkyl ether carboxylate.

5. The method of claim 3 wherein the cationic surfactant is selected from the group consisting imidazolines, dialkyl quaternary ammonium chlorides, dialkyl benzyl quaternary ammonium chlorides, amine oxides and ethoxylated amines.

6. The method of claim 3 wherein the nonionic surfactant is selected from the group consisting of alkanolamides, ethoxylated alkanolamide, ethylene bisamide, fatty acid esters, glycerol esters, sorbitan esters, ethoxylated fatty acids, ethoxylated glycol esters, polyethylene glycol esters, ethoxylated sorbitan esters, alkylphenol ethoxylate, alcohol ethoxylate, tristrylphenol ethoxylate, mercaptan ethoxylate, alcohol alkoxylate, ethylene oxide/propylene oxide block copolymer, chlorine capped ethoxylate and reverse copolymer.

7. The method of claim 3 wherein the amphoteric surfactant is selected from the group consisting of imidazaline mono acetate, imidazaline diproprionate, imidazaline amphoteric sulfonate, alkyl betaine, sultaine, dihydroxyethyl glycinate, alkyl amidopropyl betaine and aminopropionate.

8. The method of claim 1 wherein the aqueous medium is treated with about 1 to about 2000 ppm of the oil-in-water emulsion.

9. The method of claim 1 wherein the aqueous medium is treated with about 5 to about 500 ppm of the oil-in-water emulsion.

10. The method of claim 1 wherein the aqueous medium is treated with about 10 to about 100 ppm of the oil-in-water emulsion.

11. The method of claim 1 wherein the oil-in-water emulsion comprises from about 1 to about 70% by weight of the antimicrobial oil phase and from about 1 to about 25% by weight of the emulsifier.

12. The method of claim 1 wherein the oil-in-water emulsion further comprises an oil-base inert dye.

13. The method of claim 1 wherein the oil-in-water emulsion further comprises an oil-base fluorochrome stain.

14. The method of claim 1 wherein the aqueous medium is an industrial water system.

15. A method of controlling biofouling in an aqueous medium comprising the step of treating the aqueous medium with an effective biofouling controlling amount of an oil-in-water emulsion comprising an antimicrobial oil phase and at least one emulsifier, wherein the antimicrobial oil phase is a non-aqueous phase liquid and a biofouling control agent, and wherein the non-aqueous phase liquid is selected from the group consisting of $C_4$–$C_{30}$ aliphatic alcohols, $C_4$–$C_{30}$ saturated hydrocarbons, $C_4$–$C_{30}$ monounsaturated hydrocarbons, natural oils and mineral oil paraffins, and the biofouling control agent is soluble in the non-aqueous phase liquid and is selected from the group consisting of glutaraldehyde, 2,2 dibromo-3-nitrilopropionamide, methylenebisthiocyanate, 2-bromo-2-nitropropane-1,3-diol, 2-(thiocyanomethylthio) benzothiazole, bis (trichloromethyl) sulfone, 5-chloro-2-(2,4-dichlorophenoxy)phenol, ortho phenylphenol, bromonitroethenylfuran, bromonitrostyrene, tributyltinoxide and chelating agents selected from the group consisting of ethylenediamine tetraacetic acid, ethylene glycol-bis(β-aminoethyl ether) tetraacetic acid and 8-hydroxyquinoline.

16. The method of claim 15, wherein tile oil-in-water emulsion is selected from the group consisting of microemulsions, macroemulsions and mixtures thereof.

17. The method of claim 15, wherein the emulsifier is selected from the group consisting of anionic, cationic, nonionic and amphoteric surfactants.

18. The method of claim 17, wherein the anionic surfactant is selected from the group consisting of alkyl sulfates having the formula: R—$SO_3$M, wherein R is a fatty alkyl or alkylaryl group and M is a counterion selected from the group consisting of $Na^+$, $NH^+_4$, $Mg^{++}$ and triethanolamine; ether sulfates having the formula: R—O—$(CH_2CH_2O)_n SO_3M$ wherein R is a fatty alkyl or alkylaryl group and M is a counterion selected from the group consisting of $Na^+$, $NH^+_4$, $Mg^{++}$ and trietianolamine, and n is the number of moles of ethylene oxide; dodecylbenzene sulfonate, alpha olefin sulfonate, diphenyloxide disulfonate, alkyl napthalene sulfonate, sulfosuccinate, sulfosuccinamate, napthanelene-formaldehyde condensate, sulfoester, sulfoamide, alkyl phosphate esters and alkyl ether carboxylate.

19. The method of claim 17 wherein the cationic surfactant is selected from the group consisting imidazolines, dialkyl quaternary ammonium chlorides, dialkyl benzyl quaternary ammonium chlorides, amine oxides and ethoxylated amines.

20. The method of claim 17 wherein the nonionic surfactant is selected from the group consisting of alkanolamides, ethoxylated alkanolamide, ethylene bisamide, fatty acid esters, glycerol esters, sorbitan esters, ethoxylated fatty acids, ethoxylated glycol esters, polyethylene glycol esters, ethoxylated sorbitan esters, alkylphenol ethoxylate, alcohol ethoxylate, tristrylphenol ethoxylate, mercaptan ethoxylate, alcohol alkoxylate, ethylene oxide/propylene oxide block copolymer, chlorine capped ethoxylate and reverse copolymer.

21. The method of claim 17 wherein the amphoteric surfactant is selected from the group consisting of imidazaline mono acetate, imidazaline diproprionate, imidazaline amphoteric sulfonate, alkyl betaine, sultaine, dihydroxyethyl glycinate, alkyl amidopropropyl betaine and aminopropionate.

22. The method of claim 15 wherein the aqueous medium is treated with about 1 to about 200 ppm of the oil-in-water emulsion.

23. The method of claim 15 wherein the aqueous medium is treated with about 5 to about 500 ppm of the oil-in-water emulsion.

24. The method of claim 15 wherein the aqueous medium is treated with about 10 to about 100 ppm of the oil-in-water emulsion.

25. The method of claim 15 wherein the oil-in-water emulsion comprises from about 1 to about 70% by weight of the antimicrobial oil phase and from about 1 to about 25% by weight of the emulsifier.

26. The method of claim 15 wherein the oil-in-water emulsion further comprises an oil-base inert dye.

27. The method of claim 15 wherein the oil-in-water emulsion further comprises an oil-base fluorochrome stain.

28. The method of claim 15 wherein the aqueous medium is an industrial water system.

29. A method of targeting biofilms, cell surfaces and cell aggregates in an aqueous medium comprising the step of delivering an oil-in-water emulsion comprising an antimicrobial oil phase and at least one emulsifier to the aqueous medium, wherein the antimicrobial oil phase is a non-aqueous phase liquid biofouling control agent selected from the group consisting of phenoxytol propanol, pentachlorophenol, 5-chloro-2-(dichlorophenoxy)phenol and 1-(2-hydroxyethyl)-2-alkyl($C_{18}$)-2-imidazoline.

30. A method of targeting biofilms, cell surfaces and cell aggregates in an aqueous medium comprising the step of delivering an oil-in-water emulsion comprising an antimicrobial oil phase and at least one emulsifier to the aqueous medium, wherein the antimicrobial oil phase is a non-aqueous phase liquid and a biofouling control agent, and wherein the non-aqueous phase liquid is selected from the group consisting of $C_4$–$C_{30}$ aliphatic alcohols, $C_4$–$C_{30}$ saturated hydrocarbons, $C_4$–$C_{30}$ monounsaturated hydrocarbons, natural oils and mineral oil paraffins, and the biofouling control agent is soluble in the non-aqueous phase liquid and is selected from the group consisting of glutaraldehyde, 2,2 dibromo-3-nitrilopropionamide, methylenebisthiocyanate, 2-bromo-2-nitropropane-1,3-diol, 2-(thiocyanomethylthio) benzothiazole, bis(trichloromethyl) sulfone, 5-chloro-2-(2,4-dichlorophenoxy)phenol, ortho phenylphenol, bromonitroethenylfuran, bromonitrostyrene, tributyltinoxide and chelating agents selected from the group consisting of ethylenediamine tetraacetic acid, ethylene glycol-bis(β-aminoethyl ether) tetraacetic acid and 8-hydroxyquinoline.

* * * * *